Patented Aug. 2, 1949

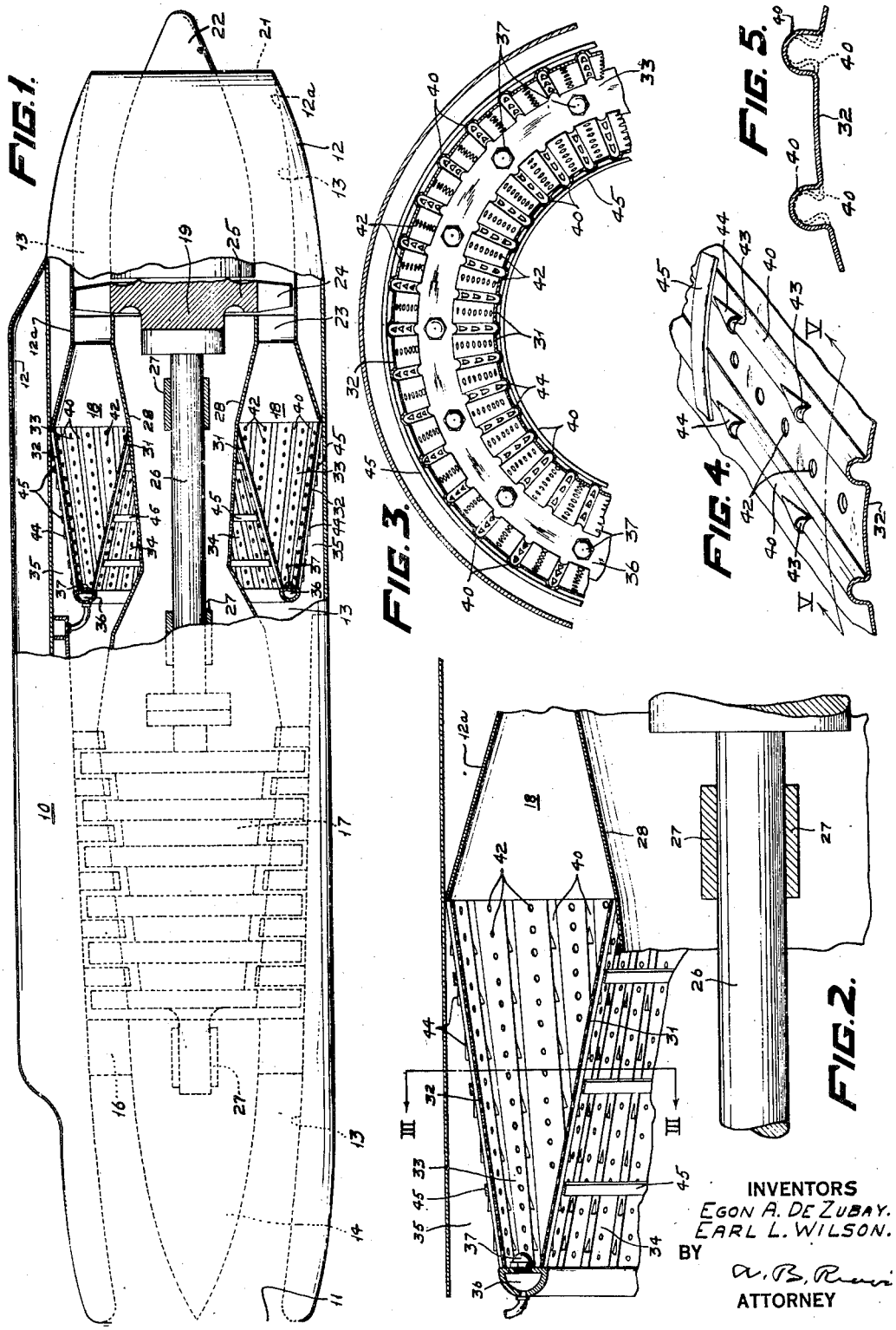

2,477,583

UNITED STATES PATENT OFFICE 2,477,583

COMBUSTION CHAMBER CONSTRUCTION

Egon A. De Zubay and Earl L. Wilson, Pittsburgh, Pa., assignors to Westinghouse Electric Corporation, East Pittsburgh, Pa., a corporation of Pennsylvania Application July 25, 1946, Serial No. 686,131

2 Claims. (Cl. 60—44)

This invention relates to combustion apparatus, more particularly to combustion chamber structure and has for an object to provide novel structure of this character.

Another object of the invention is to provide combustion apparatus including combustion chamber wall structure of relatively light weight and including novel reinforcing means.

Yet another object of the invention is to provide a sheet metal burner basket with corrugations so disposed as to stiffen the structure longitudinally while providing for expansion and contraction in directions transverse thereto.

A further object of the invention is to provide novel means for admitting air to a burner space separated from an overlapping air space by an annular wall.

These and other objects are effected by the invention as will be apparent from the following description and claims taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged longitudinal sectional view of half of a combustion chamber structure such as shown in the power plant of Fig. 1;

Fig. 3 is a transverse sectional view, taken along the line III—III of Fig. 2, looking in the direction indicated by the arrows;

Fig. 4 is an enlarged fragmentary perspective view of a portion of the structure shown in the preceding figures; and Fig. 5 is a transverse sectional view, taken along the line V—V of Fig. 4, looking in the direction indicated by the arrows.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawings more in detail, the power plant shown in Fig. 1, and indicated in its entirety by the reference character 10 is adapted to be mounted in or on the fuselage or wing of an aircraft with the left end or intake 11, as viewed in this figure, pointed in the direction of flight.

The plant comprises an outer shell or casing structure 12 providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus indicated generally 18, a turbine 19 which drives the compressor, and a nozzle 21 defined by the casing 12a and by a tailpiece 22, the latter being mounted coaxially in the casing 12a and cooperating with the casing to provide the propulsion nozzle.

Air enters at the intake 11 and flows substantially straight through the plant, passing through the compressor 17 where its pressure is raised, and into the combustion apparatus 18, where it is heated. The hot gases, comprising the products of combustion, and excess air heated by the combustion, on leaving the combustion apparatus, are directed by suitable guide vanes or nozzles 23 against the blades 24 of the turbine disc 25, and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, indicated generally 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross sectional area from its upstream end to its downstream end. Conversely, the inner and outer overlapping air spaces 34 and 35, the former defined by the walls 28 and 31 and the latter by the walls 12a and 32, decrease in cross sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions substantially parallel to the longitudinal axis of the power plant.

In power plants of the type herein illustrated, particularly when intended for use in aircraft, it is desirable to make the combustion apparatus 18 of as light weight materials as practical. Consequently, applicants form the inner and outer walls 31 and 32 of relatively thin sheet stock, and to permit the use of thinner stock than would otherwise be acceptable, they provide the novel reinforcing structure now to be described.

In producing a burner chamber wall of this character, it is necessary to provide solutions for three problems usually present. These problems are axial distortion, circumferential distortion and occurrence of hot spots or burn-out of the walls. Applicants provide the walls 31 and 32 with corrugations 40 extending axially of the apparatus and projecting out into the air spaces 34 and 35.

It will be apparent that these corrugations act as axial beams, resisting any attempt at warpage, and, further, tend to localize the circumferential expansion and contraction to a relatively small area between the corrugations, which, in themselves, act as expansion joints (Fig. 5). Furthermore, the corrugations, by extending into the air supply spaces 34 and 35, act as cooling fins providing additional surface for transfer of heat to the air in these air spaces.

The walls 31 and 32 are provided with axially-extending rows of openings 42, preferably disposed between the corrugations 40, for admission of air from the air spaces 34 and 35 to the burner space 33. If desired, additional air admission openings 43 may be provided in the corrugations 40 by slitting the latter transversely of the tops thereof and deforming the material outwardly at the downstream side of such slits, thereby providing scoops 44 for directing air into the burner space.

The purpose of openings 43 is to provide a certain amount of cooling air parallel to the direction of gas flow, whereas the air entering the openings 42 provide jets at right angles to the gas flow, penetrating the hot gases to produce good mixing.

The present invention also contemplates the use of circumferential reinforcing bands 45 engaging the tops of the corrugations 40 and secured to the latter, as by welding. It has previously been attempted to apply circumferential bands to annular burner walls, but such walls were not corrugated, and the presence of such bands caused localized warping between adjacent bands as well as burn-outs. The latter resulted from eddy currents or wakes created downstream of the bands, these eddys tending to aspirate the flame out through the air admission openings.

With the bands spaced from the openings 42 by the height of the corrugations 40, the eddy currents are sufficiently removed from the vicinity of the air admission openings to avoid any tendency towards production of an aspirating effect on the flame within the burner space 33.

While we have shown the invention in but one form, it will be obvious to those skilled in the art that it is not so limited, but is susceptible of various changes and modifications without departing from the spirit thereof.

What is claimed is:

1. In combustion apparatus, an annular wall separating a burner space from an overlapping space adapted for flow of air therethrough longitudinally, an area of said wall being corrugated with each corrugation continuous from end to end of the corrugated area and the axes of the corrugations lying in planes parallel to the longitudinal axis of said annular wall with the corrugations lying entirely outside of said burner space, and said wall having rows of openings disposed between the corrugations and the tops of said corrugations being provided with openings, and scoop structure at the downstream sides of said last-mentioned openings, considered in the direction of air flow therepast, for directing through said last-mentioned openings air from the overlapping air space.

2. Structure as specified in claim 1, including a plurality of axially-spaced stiffening and reinforcing bands disposed circumferentially of the annular wall and engaging only the tops of the corrugations, whereby air for the openings between the corrugations may flow to said openings beneath said bands, thereby avoiding aspirating effects on the flame within the burner space.

EGON A. DE ZUBAY.
EARL L. WILSON.

REFERENCES CITED

The following references are of record in the file of this patent:

UNITED STATES PATENTS

| Number | Name | Date |
| --- | --- | --- |
| 1,100,101 | Scheu | June 16, 1914 |
| 1,148,803 | Scheu | Aug. 3, 1915 |
| 1,483,917 | Tucker | Feb. 19, 1924 |
| 1,594,797 | Scheu | Aug. 2, 1926 |
| 1,676,080 | Davis | July 3, 1928 |
| 1,811,371 | Takimizu et al. | June 23, 1931 |
| 1,978,904 | Johnson | Oct. 30, 1934 |
| 1,986,020 | Shaw et al. | Jan. 1, 1935 |
| 2,417,445 | Pinkel | Mar. 18, 1947 |